March 28, 1967  C. B. RICHEY  3,311,192
TREE WORKING PLATFORM

Filed March 2, 1966  3 Sheets-Sheet 1

INVENTOR.
CLARENCE B. RICHEY
BY
Tweedale & Gerhardt
ATTORNEYS.

March 28, 1967  C. B. RICHEY  3,311,192
TREE WORKING PLATFORM
Filed March 2, 1966  3 Sheets-Sheet 2

INVENTOR.
CLARENCE B. RICHEY
BY Tweedale & Gerhardt
ATTORNEYS.

United States Patent Office 3,311,192
Patented Mar. 28, 1967

3,311,192
TREE WORKING PLATFORM
Clarence B. Richey, Fresno, Calif., assignor to
Massey-Ferguson Inc., Detroit, Mich.
Filed Mar. 2, 1966, Ser. No. 531,267
10 Claims. (Cl. 182—141)

This invention relates to a platform by means of which a worker can have access to all the limbs of a tree for gathering fruit, nuts and the like, and for pruning and other operations without having to change the position of the platform.

The present invention is primarily concerned with increasing the productivity of labor in the harvesting of fruit and nuts by enabling a worker to move at will around a tree in paths about two perpendicular axes. The first axis may be defined by the axis of the tree trunk, and the second axis is perpendicular to and intersects the first axis.

Embodiments of the invention will now be described, by way of example, in connection with the accompanying drawing in which.

Figure 1:
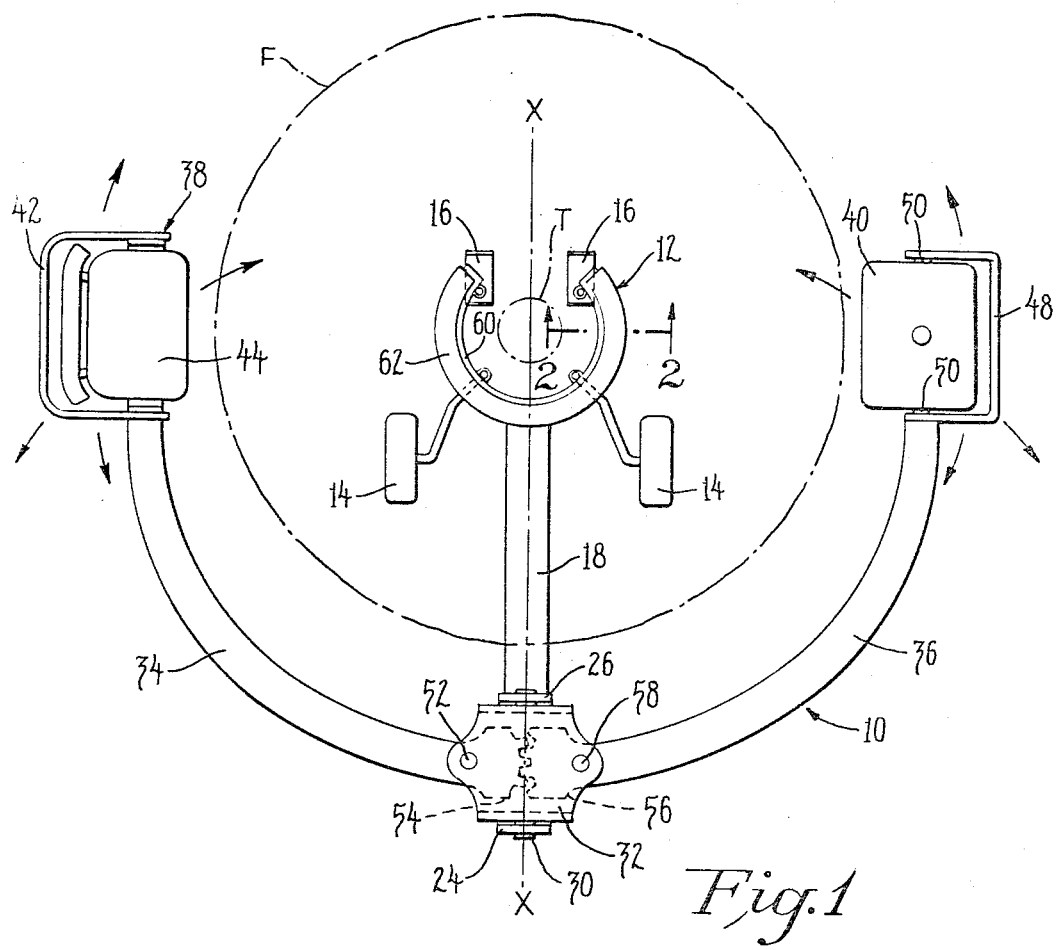
FIG. 1 is a plan view of a tree working platform embodying a first form of the invention.
Figure 3:
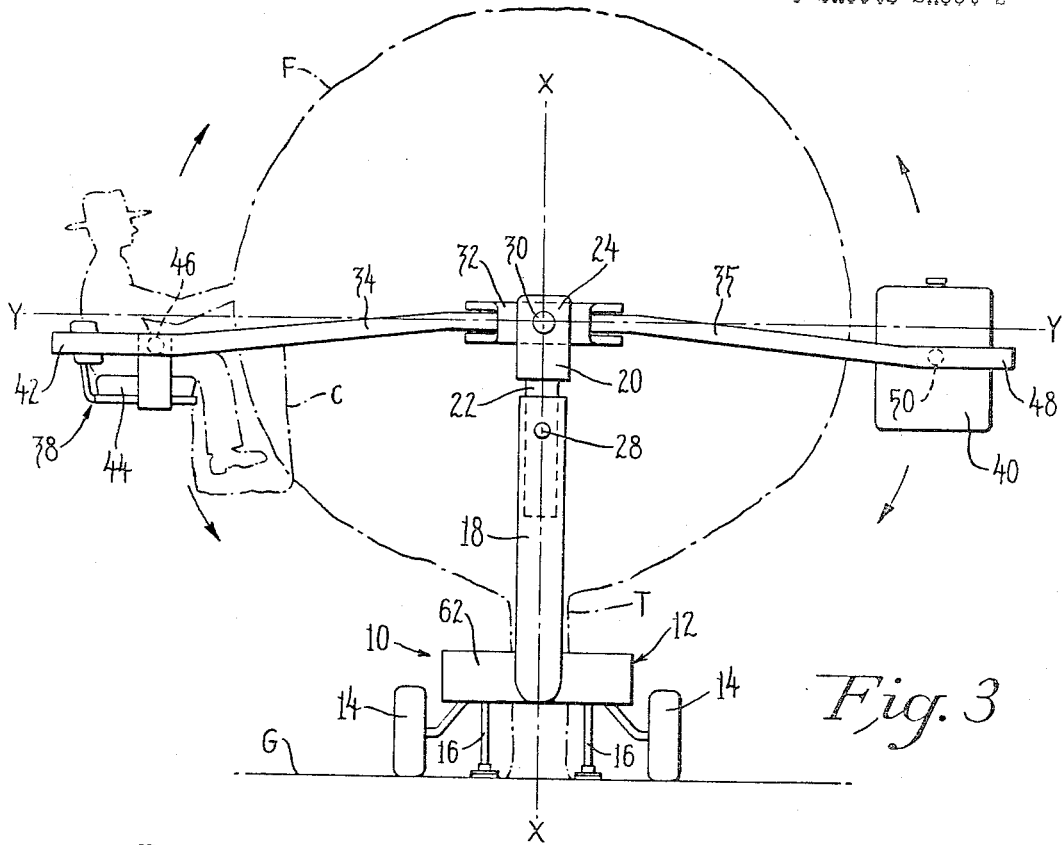
FIGS. 3 and 4 are elevational views taken at right angles to each other of the platform of FIG. 1.
Figure 4:
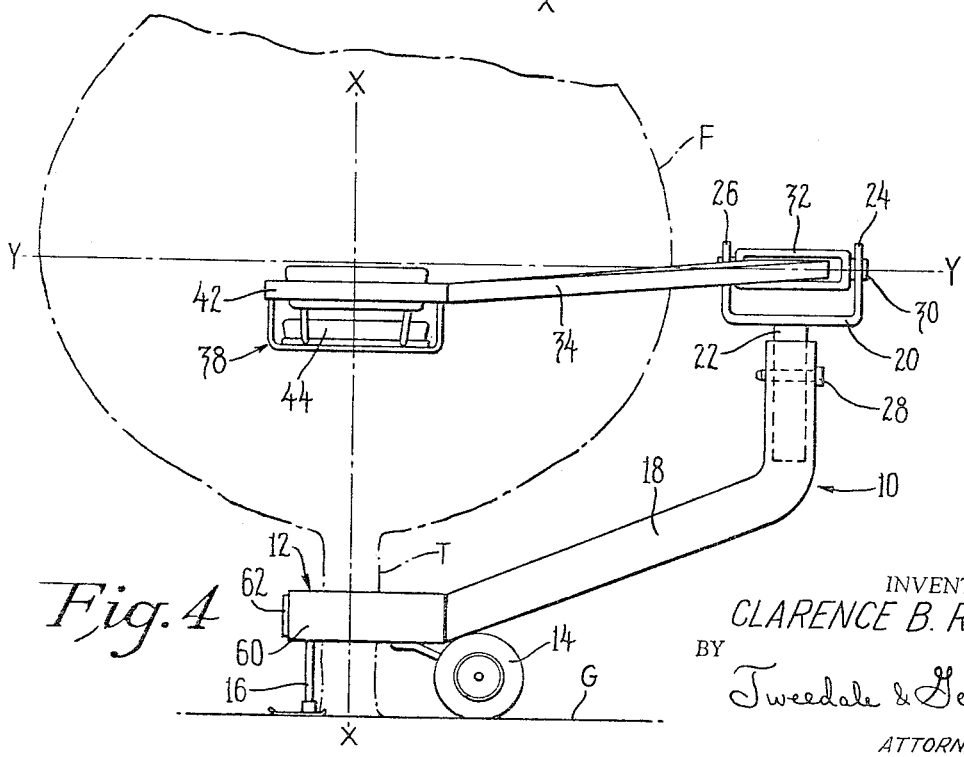

With reference to FIGS. 1, 3 and 4, reference numeral 10 designates collectively a tree working platform having a base member including a turntable 12 supported on the ground by a pair of wheels 14 and adjustable supporting legs 16.

Mounted on turntable 12 is a framework including an outwardly and upwardly projecting mast 18 and a pair of curved support arms 34 and 36. Mounted in the upper end of the mast 18 is a yoke member 20 having a pair of upstanding legs 24 and 26 projecting from a shank 22 which is mounted in mast 18 and secured against rotation with respect thereto by a pin 28.

Pivotally mounted between legs 24 and 26 of the yoke member 20 by trunnions 30 is a cradle 32 which supports the ends of the inner ends of the curved support arms 34 and 36. A carrier 38 is mounted on the free end of arm 34 and a ballast tank 40 is mounted on the free end of arm 36. Carrier 38 includes a C-shaped frame 42 which pivotally supports a seat 44 for a worker to pick fruit from the tree F. Seat 44 is pivotally connected at 46 to the arms of frame 42.

A frame 48 similar to frame 42 is mounted on the free end of frame arm 36 and the ballast tank 40 is pivotally supported at 50 on the parallel arms of frame 48. The support arm 34 is secured to cradle 32 for pivotal movement with respect thereto by a pin 52, and arm 36 is similarly pivotally connected with cradle 32 by pin 58. A gear segment 54 is formed on the inner end of frame arm 34 which is received within the cradle 32 and is engaged with a similar gear segment 56 formed on the opposed inner end of arm 36. Thus, pivotal movement of carrier 38 about the axis of pin 52 causes corresponding pivotal movement of ballast tank 40 about the axis of pin 58 to maintain the carrier and ballast tank equidistant from the vertical axis which is substantially coaxial with the trunk T of the tree.

Figure 2:
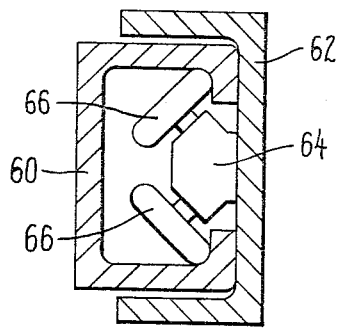
FIG. 2 is a sectional detail view taken on line 2—2 of FIG. 1.

With reference to FIGS. 1 and 2, the turntable includes a curved track member 60 of C-shaped cross-section which is preferably concentrically disposed with respect to the trunk T of the tree F. Mast 18 projects from a carriage member 62 of C-shaped cross-section having a plurality of roller supports 64 projecting inwardly toward the vertical axis of the turntable. Oppositely inclined rollers 66 and 68 are mounted on supports 64 for bearing engagement with the inner surfaces of track member 60 such that carriage member 62 is free to rotate around the track 60 to swing mast 18 as well as carrier 38 and ballast tank 40 about the axis of the tree trunk.

In operation, the turntable is positioned in concentric relationship with the trunk T and is supported on the ground G by the wheels 14 and adjustable legs 16. Ballast tank 40 is filled such that its weight will substantially balance the weight of a person seated in carrier 38 together with a bag or similar container full of fruit. The worker with an empty container C mounts the carrier 38 and the ballast member 40 will move the carrier and worker to the top of the tree. By grasping the branches of the tree the worker can move the carrier toward or away from the vertical axis X—X of the turntable and tree trunk, which movement is simultaneously transmitted to the ballast tank to maintain ballast tank and the carrier equi-distance from axis X—X. The ballast tank, vertical axis X—X of the turntable and carrier 38 are in line to minimize the tendency of the platform to tilt about the axis of wheels 14. The turntable permits the worker to pull himself completely around the tree about axis X—X through an angle of 360 degrees. As he gathers fruit into container C, the weight of the carrier gradually increases tending to pull the ballast tank upwardly about the axis Y—Y until the worker gradually works himself downwardly on the tree to the ground to unload his container, and if necessary refill the container by working simself up and down and around the tree. The worker can move himself in either direction about axes X—X and Y—Y by grasping the tree branches.

When the tree has been picked clean of fruit and the like, the platform may be towed to another tree and the operation repeated. The fruit picker is thus able to freely move about the vertical axis X—X defined generally by the longitudinal axis of the trunk T and the horizontal axis Y—Y through pins 30 so that the entire tree can be covered without moving the platform.

Figure 5:
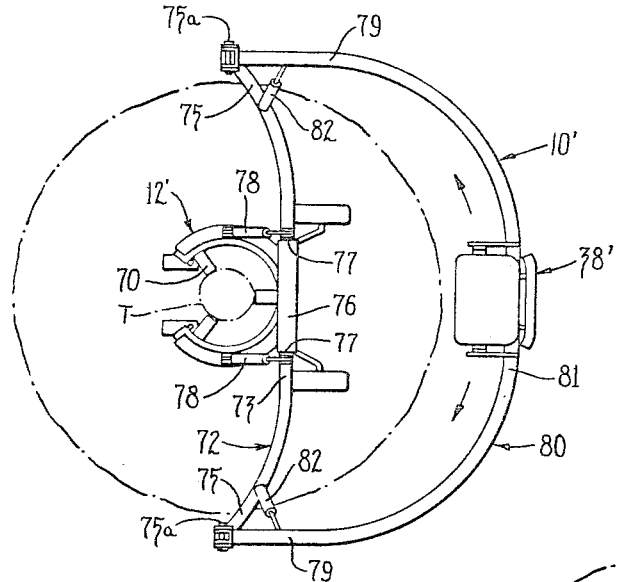
FIGS. 5 and 6 are plan elevational views, respectively, of a second embodiment of the invention.
Figure 6:
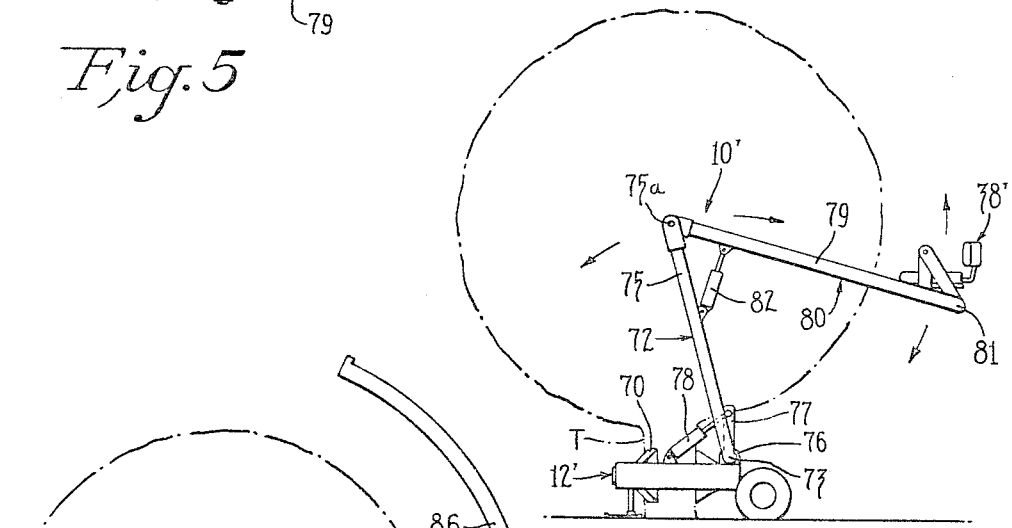

FIGS. 5 and 6 illustrate a platform 10' according to a second embodiment of the invention wherein the worker can raise and lower himself around the periphery of the tree by actuating hydraulic rams. The base of the platform 10' includes a turntable 12' similar to turntable 12 of the previous embodiment and has clamping members 70 engageable with the tree trunk to prevent the platform from overturning. Turntable 12' supports the framework including a first U-shaped frame member 72 having a generally horizontal base portion 73 and upwardly projecting arms 75. Frame member 72 is rotatably mounted on the turntable by a bearing sleeve 76 enclosing the base portion 73 such that arms 75 can be raised and lowered about the axis of sleeve 76 by hydraulic rams 78 mounted between the turntable and levers 77 non-rotatably secured to frame member 72.

Pivotally mounted on the ends of arms 75 by pins 75a are the ends of arms 79 of a second U-shaped frame member 80, on the base portion 81 of which is mounted the carrier 38'. Frame member 80 is rotatable about the axis of pins 75a by hydraulic rams 82 mounted between frame members 72 and 80.

The worker seated on a carrier 38' can rotate himself about the axis of the trunk T by grasping the branches of the tree and can raise and lower himself hydraulically by the rams 78 and 82. Rams 78 move the carrier 38' inwardly and outwardly with respect to the tree trunk, and rams 82 raise and lower the carrier 38' about the axis of pins 75a, the rams 78 and 82 being controlled from carrier 38'.

Figure 7:
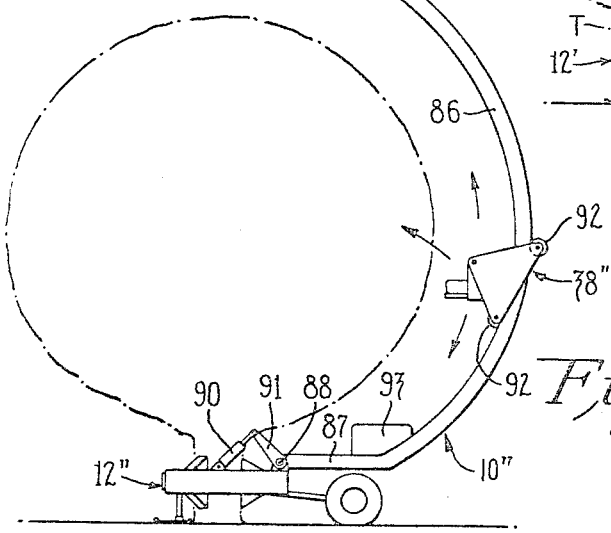
FIG. 7 is an elevational view of a third embodiment of the invention.

In the embodiment of FIG. 7, the base of the platform 10" includes a turntable 12" similar to turntables 12 and 12' on which is pivotally mounted a curved mast 86 which extends vertically around the periphery of the tree in generaly concentric relationship therewith. Mast 86 has a horizontal base portion 87 which is secured to the turntable 12" for pivotal movement about the axis of a shaft 88 so that the worker can be moved inwardly and outwardly relative to the tree trunk. A hydraulic ram 90 mounted between the turntable and a lever 91 secured to shaft 88 actuates the mast 86 about shaft 88. A carrier 38" is mounted on mast 86 by rollers 92 in such a manner that it can be moved upwardly and downwardly along the mast to raise and lower the worker seated thereon. A motor 93 having controls accessible to the worker while on the carrier 38" raises and lowers carrier 38". By grasping the branches of the tree, the worker can swing himself about the vertical axis of the turntable, and by manipulating the controls of motor 92, he can raise and lower himself relative to the ground.

While several embodiments of the invention have been illustrated and described in detail, it should be understood that the invention is not limited to the exact construction shown, but that various alternative arrangements, equivalents and variations in the construction and arrangement of parts will become apparent to those skilled in the art without departing from the scope and spirit of the invention.

I claim:

1. A tree working platform comprising: a base member adapted to be supported on the ground adjacent to the base of the tree, a carrier for supporting a worker, and a frame supporting the carrier on the base member for selective rotation about two perpendicular axes, the first of which is vertical and is generally coaxial with the longitudinal axis of the tree trunk to permit the carrier to move around the tree and the second of which is horizontal and is disposed above the ground to permit the carrier to move in a vertical curved path around the periphery of the three between the ground and top of the tree.

2. A tree working platform as claimed in claim 1 wherein said frame includes a mast supported on said base member for rotation about said first axis, said mast projecting outwardly and upwardly from said base member, and a pair of oppositely projecting, curved support arms mounted on the upper end of said mast for pivotal movement as a unit about said second axis, said carrier being supported on the free end of one of said arms and a ballast member being supported on the free end of the other of said arms, said carrier and ballast being supported by said arms on substantially diametrically opposite sides of said first axis.

3. A tree working platform as claimed in claim 2 wherein said curved supporting arms are mounted on said mast for pivotal movement about a third axis rotatable about and normal to said second axis to permit movement of the carrier and ballast member toward and away from said first axis, and wherein said second axis intersects the first axis.

4. A tree working platform as claimed in claim 3 further including motion transmitting means interconnecting said supporting arms to cause said ballast member to pivot about said third axis in response to pivotal movement of said carrier about said third axis but in the opposite direction so that the carrier and ballast member move simultaneously toward and away from said first axis and are always equally spaced from said first axis on opposite sides thereof.

5. A tree working platform as claimed in claim 4 wherein said base member includes a turntable having a track member in the form of a circular segment the center of which is defined by said first axis, and wherein a carriage secured to the lower end of said mast is mounted on said track for movement about the periphery thereof.

6. A tree working platform as claimed in claim 2 further including a yoke member mounted on the upper end of said mast having a pair of spaced upstanding arms, a cradle mounted between said upstanding arms for pivotal movement about said second axis, and wherein said support arms each have their inner ends mounted at spaced points in said cradle for pivotal movement about third axes normal to said second axis, and further including interengaged gear segments formed on the opposed inner ends of said support arms for causing said ballast and carrier to selectively move simultaneously toward and away from said first axis to maintain the carrier and ballast member equally spaced on opposite sides of said first axis.

7. A tree working platform as claimed in claim 1 wherein said frame includes a first U-shaped frame member having a horizontal base portion mounted on said base member for rotation about a horizontal axis and a pair of arms projecting upwardly from opposite ends of said base portion, a second U-shaped frame member having a pair of arms each pivotally connected with one of the arms of said first U-shaped frame member and a base portion between said arms, said carrier being mounted on said base portion of said second U-shaped frame member and the pivotal connection between said first and second U-shaped frame member defining said second axis, and further including a first extensible and retractable power element mounted between said base member and said first U-shaped frame member for selectively rotating said first U-shaped member about the horizontal axis of the base portion thereof to move said carrier toward and away from said first axis, and a second extensible and retractable power element mounted between said first and second U-shaped frame members for selectively rotating said U-shaped member about said second axis.

8. A tree working platform as claimed in claim 7 wherein said base member includes a turntable having a circular track the center of which is defined by said first axis, and including a carriage secured to the base portion of said first U-shaped frame member and mounted on said track for rotation about said first axis, and means for clamping said turntable to the tree trunk.

9. A tree working platform as claimed in claim 1 wherein said frame includes an upwardly projecting mast curved generally concentric with the tree and having a substantially horizontal base portion mounted on said base member for pivotal movement about a horizontal axis, and wherein said carrier is supported on said curved mast for movement along the length thereof in said vertical curved path between the ground and tree top, and further including power means mounted between said base member and the base portion of said curved mast for selectively rotating said curved mast about said horizontal axis to move the path of said carrier toward and away from said first axis.

10. A tree working platform as claimed in claim 9 wherein said base member includes a turntable having a track in the form of a circular segment the center of which is defined by said first axis, the base portion of said curved mast being supported on a carriage which is mounted on said track for movement about the periphery thereof to in turn move said carrier about said first axis.

References Cited by the Examiner

UNITED STATES PATENTS

| 1,149,786 | 8/1915 | Rowley | 182—187 |
| 1,974,572 | 9/1934 | Laflin | 182—187 |
| 2,450,152 | 9/1948 | Miller | 182—2 |
| 3,272,282 | 9/1966 | Sanders | 182—131 |

REINALDO P. MACHADO, *Primary Examiner.*